(12) United States Patent
Berthoud et al.

(10) Patent No.: US 6,829,344 B1
(45) Date of Patent: Dec. 7, 2004

(54) METHODS AND DEVICES FOR FORWARDING IDENTIFICATION DATA

(76) Inventors: Charles W. Berthoud, 4643 Stafford Ave., Bethlehem, PA (US) 18020; James J. Greybush, 3131 Douglas Rd., Allentown, PA (US) 18103

( * ) Notice: Subject to any disclaimer, the term of this patent is extended or adjusted under 35 U.S.C. 154(b) by 0 days.

(21) Appl. No.: 09/527,678

(22) Filed: Mar. 17, 2000

(51) Int. Cl.[7] .............................................. H04M 3/42
(52) U.S. Cl. ........................... 379/218.01; 379/201.01; 379/207.12
(58) Field of Search ....................... 379/100.01, 201.01, 379/201.06, 201.08, 207.11, 207.12, 215.01, 218.01, 265.09, 142.01, 142.1

(56) References Cited

U.S. PATENT DOCUMENTS

| | | | |
|---|---|---|---|
| 4,608,460 A | * | 8/1986 | Carter et al. ............ 379/218.01 |
| 4,954,958 A | * | 9/1990 | Savage et al. ............... 701/202 |
| 5,239,577 A | * | 8/1993 | Bates et al. ............. 379/211.02 |
| 5,339,351 A | | 8/1994 | Hoskinson et al. |
| 5,546,447 A | | 8/1996 | Skarbo et al. |
| 5,771,283 A | | 6/1998 | Chang et al. |
| 5,796,806 A | | 8/1998 | Birckbichler |
| 5,822,727 A | | 10/1998 | Garberg et al. |
| 5,832,433 A | | 11/1998 | Yashchin et al. |
| 5,901,214 A | | 5/1999 | Shaffer et al. |
| 6,097,793 A | * | 8/2000 | Jandel ...................... 379/93.23 |
| 6,289,090 B1 | * | 9/2001 | Tessler et al. .......... 379/207.02 |
| 6,353,664 B1 | * | 3/2002 | Cannon et al. ......... 379/142.01 |
| 6,377,569 B1 | * | 4/2002 | Tsujigawa et al. ......... 370/352 |
| 6,377,570 B1 | * | 4/2002 | Vaziri et al. ................ 370/352 |
| 6,404,863 B1 | * | 6/2002 | Beamish ................... 379/93.35 |
| 6,421,425 B1 | * | 7/2002 | Bossi et al. .................... 379/52 |
| 6,480,484 B2 | * | 11/2002 | Morton ....................... 370/352 |
| 6,580,790 B1 | * | 6/2003 | Henry et al. ........... 379/201.01 |

OTHER PUBLICATIONS

• Advanced database preprocessing and preparations that enable telecommunications services based on speech synthesis (Abstract, Oct., 1997, Bellcore, *Speech Communication* V. 23, No. 1–2 p. 51–63.

• "A field evaluation of the Italian Automated reverse directory assistance service" *Intil Journal of Speech Technology* vol. 1, No. 2 p. 161–9.

* cited by examiner

*Primary Examiner*—Bing Bui

(57) ABSTRACT

Supplied with only a telephone number, a device is capable of locating and then forwarding the name and/or address associated with the telephone number. The name or address is forwarded to a near-end device, such as a telephone, using an existing caller identity delivery ("CID") data link.

41 Claims, 1 Drawing Sheet

METHODS AND DEVICES FOR FORWARDING IDENTIFICATION DATA

BACKGROUND OF THE INVENTION

At some point in time, most of us have been in a situation where we need the address and/or name of someone or someplace, yet all we have is a telephone number. For example, sometimes we have the telephone number of a friend but not their address. If we were to try visiting a friend we might try to call first to get an address. Sometimes, however, friends are difficult to reach, or for various personal reasons, it may be awkward to call a friend just to get their address. Other times, we wish to remain anonymous, yet still desire to obtain or verify the address of another individual by using only the telephone number of the individual. In still other instances, there exists devices which display the telephone number of a caller but not their name or address. Before returning the call, it would be useful to be able to verify the name and address of the caller.

There exists today a few ways to obtain a name and address associated with a telephone number. Each of these ways has their own drawbacks. One way is by using a physical (i.e., paper copy) "reverse-index telephone book" or "reverse telephone book". These books list telephone numbers in numerical order along with the name and address associated with each number. The major drawbacks to using this method are availability and accuracy. Most people and businesses do not ordinarily have a copy of a reverse telephone book at the ready when it is needed. Instead, they end up going to a reference library or the like to access such a book. Even when they access a reverse telephone book there is no guarantee that the names and addresses in the book will be accurate or up-to-date. Instead, these books may contain out-of-date information due to the time lag between the date the information was obtained and the date that the book was ultimately published or used.

Accordingly, it is desirable to provide for methods and devices for forwarding the name, address or other identification data (hereafter collectively "identification data") associated with a telephone number without the need to refer to a reverse telephone book.

It is also desirable to devise methods and devices for providing services which forward identification data associated with telephone numbers, which require only a minimal amount of changes to existing telephone company equipment in order to minimize the cost of providing such services.

Other objectives, features and advantages of the present invention will become apparent to those skilled in the art from the following description taken in conjunction with the accompanying drawings.

SUMMARY OF THE INVENTION

In accordance with the present invention there are provided methods and devices for forwarding identification data, such as names and addresses. Upon the reception and input of a telephone number associated with a far end device, a novel device compares the number to a list of stored numbers. If a match occurs, the device outputs at least a name or address associated with the far end device, such as a telephone, over an existing type 2, CID data link.

The device may comprise a telephone central office, stored program control system, central office switch or some type of programmed medium.

The device can be adapted to prevent the output of the identification data unless a valid access or password is received from a near end device (e.g., telephone).

The present invention and its advantages can be best understood with reference to the drawings, detailed description of the invention and claims that follow.

DETAILED DESCRIPTION OF THE INVENTION

Figure 1:
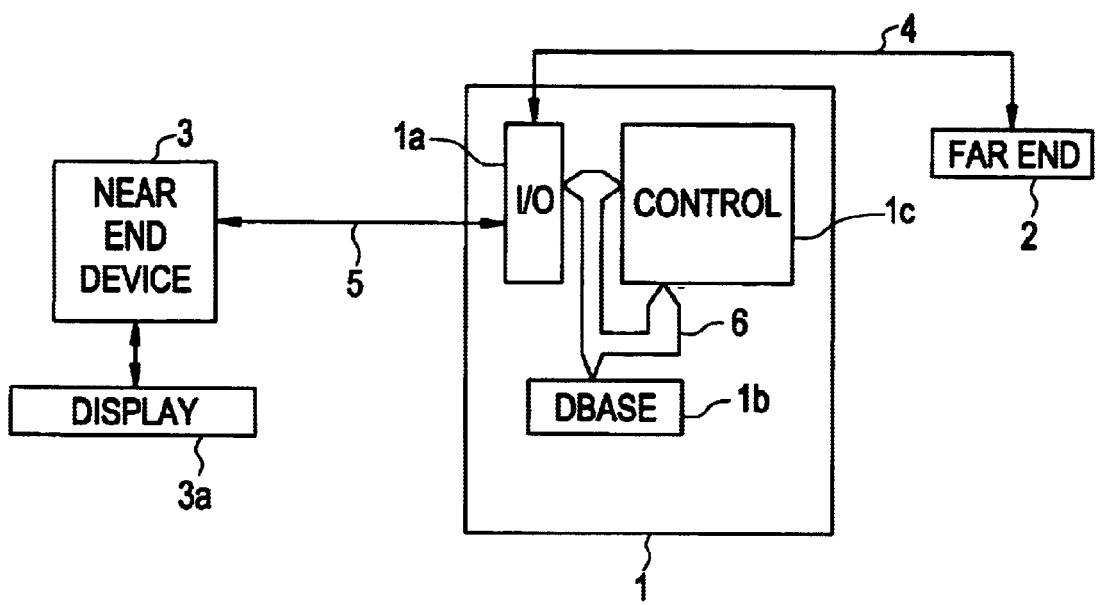
FIG. 1 depicts a device for controlling the forwarding of identification data according to one embodiment of the present invention.

FIG. 1 depicts a device 1 for forwarding identification data, associated with a telephone number of a far end device 2, to near end device 3. In illustrative embodiments of the invention, the device 1 may comprise a telephone company central office, a stored program control system, a central office electronic switch, a programmed medium or the like.

As shown, the device 1 is adapted to link the near end device, 3, such as a telephone, facsimile machine or the like and a display 3a, to the far end device 2 which may also comprise a telephone, facsimile machine or the like, or vice-versa. In an illustrative embodiment of the invention, the device 1 comprises input/output unit ("I/O") or means 1a, control unit or means 1c and database unit or means 1b all connected via pathway 6. It should be understood that although the device 1 is shown as comprising three separate units and one separate pathway, these units and pathways can be combined into fewer units or pathways or further broken down into additional units and/or pathways. As used herein, "near end" device means a device which retrieves identification data from device 1 while "far end" device means the device or devices associated with identification data, as will be explained below.

Near end device 3 is adapted to be linked with device 1 using a CID data link or pathway 5. As is known in the art, CID data is normally transmitted to the near end device 3 when device 3 and device 1 have been configured to carry out a "call waiting" service or the like. For example, if telephone 3 is off-hook (i.e., in use) and a user of telephone 3 receives another call (referred to as a "next call") the telephone number of the next call will be sent to device 3 by device 1 using the CID data link 5 and then displayed on display 3a. Thereafter the user can "dial" or otherwise input the next call telephone number into device 1 in order to link the user's device 3 to a far end device 2 associated with the next call telephone number.

Unlike the example just described, the present invention is aimed at providing identification data to device 3 whether or not a next call is received or not. In the example given above, "CID data" is only forwarded to device 3 after a far end caller has placed a next call to a user of device 3. In contrast, the present invention envisions providing "identification data" to device 3 about any far end device 2 whether or not the far end device 2 or caller has ever placed a telephone call or next call to the user or device 3.

In an illustrative embodiment of the invention, I/O unit 1a is adapted to output or forward identification data to device 3 based on a communication number, which is associated with a far end device 2, input into device 1. More specifically, device 1 is adapted to output identification data to near end device 3 via the same CID data link 5 or the like. In more detail, a user of near end device 3 accesses device 1 and inputs a communication number, such as a telephone number or the like, into device 1. I/O unit 1a is adapted to input or otherwise receive the telephone number. Thereafter, control unit 1c is adapted to compare the telephone number to stored communication numbers (e.g., telephone numbers). In an illustrative embodiment of the invention, database unit 1b is adapted to store telephone numbers associated with far end devices 2 along with identification data associated with each far end device. Continuing, control unit 1c is adapted to compare the input telephone number to the telephone numbers stored in database unit 1b. If control unit 1c determines that there is a match, then I/O 1a is adapted to output the identification data associated with the matched telephone number to near end device 3 over CID data link 5. In a further embodiment of the invention, the CID data link 5 comprises a "Type 2" CID data link.

In a further illustrative embodiment of the invention, the input communication number comprises a dual-tone, multi-frequency ("DTMF") signal (i.e., touch-tone signals) representing a telephone number. It should be understood that the word "signal" means singular or plural signals.

Summarizing, so far we have described how device 1 forwards identification data, such as at least a name or address, associated with a telephone number of a far end device 2 to a user over an existing CID data link 5. It should be understood that the user can access device 1 at any time after she receives a telephone number regardless of how, where or when she initially obtains the telephone number. Said another way, the present invention envisions forwarding identification data to near end device 3 via an existing CID data link 5: (a) when far end device 2 has called near end device, 3; and (b) even when a far end device 2 has not attempted to call near end device 3.

Though the example just given uses a telephone number as the communication number which is input or stored and names and addresses as identification data, the present invention is not so limited. Any type of alpha-numeric sequence which can be represented as a DTMF signal or the like can be used as a communication number. Similarly, database unit 1b can be adapted to store, and I/O unit 1a can be adapted to output, any type of alpha-numeric sequence which can be sent via CID data link 5 or the like and displayed on display 3a. Some other examples of communication numbers and stored identification data are: facsimile numbers, modem numbers, and Internet addresses to name just a few.

It should be further understood that, as illustrated by the example just given, the present invention does not require a telephone company or the like to make significant hardware or software changes to device 1 nor does it require a user to purchase any additional hardware or software other than the CID related equipment and service she already owns or pays for. Instead, the present invention envisions minimal modifications in order to carry out the functions set forth above and below. Users need only access device 1 using their existing equipment 3 and existing CID data links to retrieve identification data. Telephone companies need only reprogram their existing central office equipment using methods disclosed above and/or below or purchase a minimal amount of new hardware/software.

In further illustrative examples of the invention, database unit 1b comprises a database adapted to be updated with the most recent identification data and telephone numbers. This allows the device 1 to provide a user with the most updated information available regarding the identity, address, etc . . . associated with a telephone number of a far end device 2 or the like.

It was noted above that a user must access device 1 in order to retrieve identification data. In additional embodiments of the present invention, the user must input an access code or password before accessing device 1, for example, by using a touch tone keypad which is a part of near end device 3. In the event access codes or passwords are required, I/O unit 1a is further adapted to receive and otherwise input an access code or the like via pathway 5. Once received, control unit 1c is further adapted to compare the received access code to a list of stored access codes. If a match occurs, then device 1 is further adapted to output a signal indicating to the user that she has gained access to device 1 in order to retrieve identification data. In addition, control unit 1c is adapted to send an authorization signal to I/O unit 1a authorizing I/O unit 1a to receive or otherwise input a communication number representing a telephone number or the like of a far end device 2. Conversely, if a match does not occur, control unit 1c is adapted to withhold an authorization signal thereby preventing I/O unit 1a from inputting a communication number from a user. The stored access codes may reside in a memory section of the control unit 1c or within a separate memory device or the like.

The end result is this: if device 1 receives a valid, matching access code or password then it allows a user to retrieve identification data; if an invalid access code is received, then the user is prevented from retrieving such data.

Figure 2:
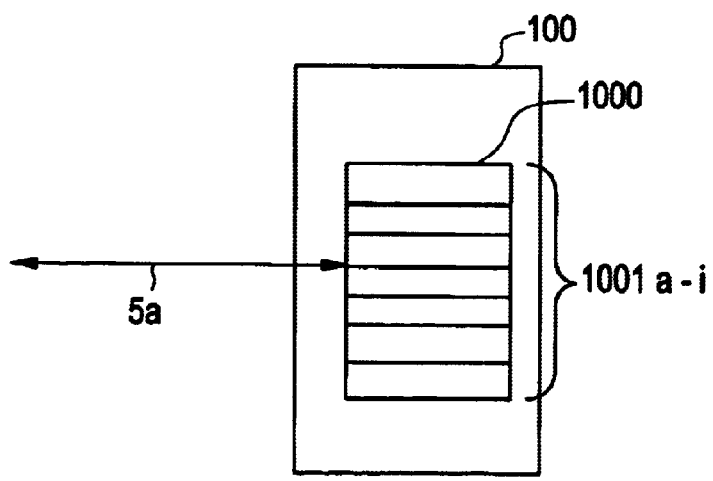
FIG. 2 depicts a programmed medium for controlling the forwarding of identification data according to one embodiment of the present invention.

Though device 1 is shown comprising database unit 1b, control unit 1c and I/O unit 1a the invention is not so limited. In alternative embodiments of the invention, the device 1 may comprise only I/O unit 1a and control unit 1c while the database unit 1b may be a part of a separate device altogether. In other embodiments of the invention, device 1 may comprise programmed medium or means such as a digital signal processor, microprocessor, memory devices, some combination of the three, floppy disk, or compact disk adapted to connect with a database unit which in turn is adapted to store identification data. FIG. 2 depicts such a programmed device 100 for controlling the forwarding of identification data according to one embodiment of the present invention.

Programmed medium 100 comprises a program or program means 1000 adapted to control the forwarding of identification data. The program 1000 further comprises program code or means 1001a–i (where "i" is the last line of code) which is also adapted to control the forwarding of identification data. It should be understood that program 1000 comprises program code 1001a-i for controlling and carrying out all of the features and functions described above. For example, program 1000 comprises program code 1001a–i adapted to control the input of a communication number associated with a far end device 2; program code 1001a-i adapted to control the comparison of an input communication number to stored communication numbers; and program code 1001a-i adapted to control the output of identification data to a near end device 3 over a CID data link 5a when the number input matches a stored communication number, to give just a few examples.

Though the discussion and examples above focus on devices and mediums for carrying out the present invention, it should be understood that the present invention also envisions methods, such as programs, for carrying out the features and functions of the present invention described above.

It is to be understood that changes and variations may be made without departing from the spirit and scope of this invention as defined by the claims that follow.

We claim:

1. A device for forwarding Internet addresses comprising:
   an input/output unit adapted to input a communication number associated with a far-end device;
   a control unit adapted to compare the number input to stored communication numbers, wherein the input/output unit is further adapted to output at least one Internet address to a near-end device over a data link selected from the group consisting of a CID data link and a Type 2 CID data link when the number input matches a stored communication number even though the far-end device has not communicated with the near-end device.

2. The device as in claim 1 wherein the device comprises a central office.

3. The device as in claim 1 wherein the device comprises a stored program control system.

4. The device as in claim 1 wherein the device comprises a central office electronic switch.

5. The device as in claim 1 where the near end device comprises a telephone.

6. The device as in claim 1 wherein the near end device comprises a facsimile machine.

7. The device as in claim 1 wherein the far end device comprises a telephone.

8. The device as in claim 1 wherein the far end device comprises a facsimile machine.

9. The device as in claim 1 further operable to forward at least a name associated with the far end device.

10. The device as in claim 1 further operable to forward at least an address associated with the far end device.

11. The device as in claim 1 wherein the communication number input comprises a telephone number.

12. The device as in claim 1 wherein the communication number input comprises a facsimile number.

13. The device as in claim 1 wherein the communication number input comprises DTMF signals.

14. The device as in claim 1 further comprising a database unit adapted to store the stored communication numbers.

15. The device as in claim 1 wherein the device is adapted to output the Internet address only upon reception of a valid access code from the near end device.

16. A programmed medium for controlling the forwarding of Internet addresses comprising:
   program code adapted to control input of a communication number associated with a far-end device;
   program code adapted to control a comparison of the number input to stored communication numbers; and
   program code adapted to control output of at least one Internet address to a near-end device over a data link selected from the group consisting of a CID data link and a Type 2 CID data link when the number input matches a stored communication number even though the far-end device has not communicated with the near-end device.

17. The programmed medium as in claim 16 wherein the programmed medium comprises a digital signal processor.

18. The programmed medium as in claim 16 wherein the programmed medium comprises a microprocessor.

19. The programmed medium as in claim 16 wherein the near end device comprises a telephone.

20. The programmed medium as in claim 16 wherein the near end device comprises a facsimile machine.

21. The programmed medium as in claim 16 wherein the far end device comprises a telephone.

22. The programmed medium as in claim 16 wherein the far end device comprises a facsimile machine.

23. The programmed medium as in claim 16 further operable to forward at least a name associated with the far end device.

24. The programmed medium as in claim 16 further operable to forward at least an address associated with the far end device.

25. The programmed medium as in claim 16 wherein the communication number input comprises a telephone number.

26. The programmed medium as in claim 16 wherein the communication number input comprises a facsimile number.

27. The programmed medium as in claim 16 wherein the communication number input comprises DTMF signals.

28. The programmed medium as in claim 16 further comprising program code adapted to control a database used to store the stored communication numbers.

29. The programmed medium as in claim 16 further comprising program code adapted to control the output of the Internet address based on the reception of a valid access code from the near end device.

30. A method for forwarding Internet addresses comprising:
   inputting a communication number associated with a far-end device;
   comparing the number input to stored communication numbers; and
   outputting at least one Internet address to a near-end device over a data link selected from the group consisting of a CID data link and a Type 2 CID data link when the number input matches a stored communication number even though the far-end device has not communicated with the near-end device.

31. The method as in claim 30 wherein the near end device comprises a telephone.

32. The method as in claim 30 wherein the near end device comprises a facsimile machine.

33. The method as in claim 30 wherein the far end device comprises a telephone.

34. The method as in claim 30 wherein the far end device comprises a facsimile machine.

35. The method as in claim 30 further comprising outputting at least a name associated with the far end device.

36. The method as in claim 30 further comprising outputting at least an address associated with the far end device.

37. The method as in claim 30 wherein the communication number input comprises a telephone number.

38. The method as in claim 30 wherein the communication number input comprises a facsimile number.

39. The method as in claim 30 wherein the communication number input comprises DTMF signals.

40. The method as in claim 30 further comprising storing the stored communication numbers.

41. The method as in claim 30 further comprising outputting the Internet address only upon reception of a valid access code from the near end device.

* * * * *

UNITED STATES PATENT AND TRADEMARK OFFICE
CERTIFICATE OF CORRECTION

PATENT NO. : 6,829,344 B1
DATED : December 7, 2004
INVENTOR(S) : Charles W. Berthoud and James J. Greybush It is certified that error appears in the above-identified patent and that said Letters Patent is hereby corrected as shown below:

<u>Title page,</u>
Item [73], Assignee, insert -- Lucent Technologies Inc., Murray Hill, NJ (US) --.

Signed and Sealed this

Twenty-fifth Day of October, 2005

JON W. DUDAS
*Director of the United States Patent and Trademark Office*